United States Patent
Matsuda

(10) Patent No.: US 12,536,899 B2
(45) Date of Patent: Jan. 27, 2026

(54) TRAFFIC FLOW MONITORING DEVICE, TRAFFIC FLOW MONITORING METHOD, AND RECORDING MEDIUM

(71) Applicant: NEC Corporation, Tokyo (JP)

(72) Inventor: Yuma Matsuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 158 days.

(21) Appl. No.: 18/286,888

(22) PCT Filed: Apr. 23, 2021

(86) PCT No.: PCT/JP2021/016465
§ 371 (c)(1),
(2) Date: Oct. 13, 2023

(87) PCT Pub. No.: WO2022/224445
PCT Pub. Date: Oct. 27, 2022

(65) Prior Publication Data
US 2024/0194061 A1    Jun. 13, 2024

(51) Int. Cl.
*G08G 1/01* (2006.01)
*G08G 1/04* (2006.01)
*G08G 1/052* (2006.01)

(52) U.S. Cl.
CPC ......... *G08G 1/0133* (2013.01); *G08G 1/0145* (2013.01); *G08G 1/04* (2013.01); *G08G 1/052* (2013.01)

(58) Field of Classification Search
None
See application file for complete search history.

(56) References Cited

U.S. PATENT DOCUMENTS

| | | | |
|---|---|---|---|
| 10,431,077 B2 * | 10/2019 | Martin | G08G 1/07 |
| 11,468,667 B2 * | 10/2022 | Salemi | G06V 10/30 |
| 11,782,231 B2 * | 10/2023 | Raghavan | G02B 6/508 |
| | | | 405/184.4 |

(Continued)

FOREIGN PATENT DOCUMENTS

| | | |
|---|---|---|
| JP | H03-260799 A | 11/1991 |
| JP | H08-106593 A | 4/1996 |

(Continued)

OTHER PUBLICATIONS

International Search Report for PCT Application No. PCT/JP2021/016465, mailed on Jun. 15, 2021.

(Continued)

*Primary Examiner* — Peter D Nolan
(74) *Attorney, Agent, or Firm* — Sughrue Mion, PLLC

(57) ABSTRACT

The traffic flow monitoring device includes a detection unit that outputs a first comparison result, which is a result of comparing a first reference speed and an average speed at a first time, on the basis of speed data associating a time with an average speed of a vehicle travelling through a prescribed spot on a road, an approximate speed calculation unit that derives an approximate speed at the first time on the basis of a change in the average speed at or before the first time and a determination unit that determines a change in the traffic flow at the prescribed spot on the basis of the first comparison result and a second comparison result which is the result of comparing the approximate speed and a second reference speed.

9 Claims, 14 Drawing Sheets

(56) References Cited

U.S. PATENT DOCUMENTS

| | | | |
|---|---|---|---|
| 2004/0061628 A1* | 4/2004 | Hill | G08G 1/02 |
| | | | 340/933 |
| 2004/0067004 A1* | 4/2004 | Hill | G08G 1/04 |
| | | | 356/478 |
| 2008/0277568 A1* | 11/2008 | Crickmore | G01D 5/35361 |
| | | | 250/227.12 |
| 2018/0342156 A1* | 11/2018 | Martin | G08G 1/052 |
| 2019/0137305 A1* | 5/2019 | Karabacak | G01D 5/353 |
| 2020/0401784 A1* | 12/2020 | Salemi | G06F 18/243 |
| 2022/0032943 A1 | 2/2022 | Yoda et al. | |
| 2023/0038939 A1* | 2/2023 | Raghavan | G08G 1/02 |
| 2024/0046784 A1* | 2/2024 | Large | G08G 1/08 |

FOREIGN PATENT DOCUMENTS

| | | |
|---|---|---|
| JP | 2017-016460 A | 1/2017 |
| WO | 2020/116030 A1 | 6/2020 |

OTHER PUBLICATIONS

English translation of Written opinion for PCT Application No. PCT/JP2021/016465, mailed on Jun. 15, 2021.

\* cited by examiner

Fig.11

| CORRECT DATA | DETERMINATION RESULT | |
|---|---|---|
| | PRESENCE OF TRAFFIC JAM | SPEED ERROR |
| PRESENCE OF TRAFFIC JAM | 20 | 0 |
| ABSENCE OF TRAFFIC JAM | 0 | 20 |

TRAFFIC FLOW MONITORING DEVICE, TRAFFIC FLOW MONITORING METHOD, AND RECORDING MEDIUM

This application is a National Stage Entry of PCT/JP2021/016465 filed on Apr. 23, 2021, the contents of all of which are incorporated herein by reference, in their entirety.

TECHNICAL FIELD

The present invention relates to a traffic flow monitoring device, a traffic flow monitoring method, and a recording medium. In particular, the present invention relates to a traffic flow monitoring device capable of detecting a change in a traffic flow, a traffic flow monitoring method, and a recording medium that records a program for causing a computer to achieve a function of the traffic flow monitoring device, which are used in a traffic flow monitoring system.

BACKGROUND ART

There has been known an optical fiber sensing technique capable of detecting distortion or vibration at a position along an optical fiber by transmitting pulsed light into the optical fiber and analyzing physical properties of back scattered light thereof. Further, there has been also known a traffic flow monitoring system capable of acquiring a speed of a traveling automobile at each spot on a highway by laying an optical fiber along the highway and analyzing vibration detected by optical fiber sensing. For example, PTL 1 describes a road monitoring system that detects a traveling state of a vehicle by optical fiber sensing with a communication optical fiber.

In a traffic flow monitoring system using an optical fiber, a traffic flow on a road can be monitored for a long distance in a real-time and continuous manner. Thus, a road monitoring system using an optical fiber is capable of quickly detecting a sudden change in a traffic flow in an area inaccessible for measurement due to a blind spot for a general speed detection device using a camera or a radar. Further, an installation cost of a road monitoring system can be suppressed by using an existing communication optical fiber.

CITATION LIST

Patent Literature

PTL 1: International Patent Publication No. WO2020/116030

SUMMARY OF INVENTION

Technical Problem

In a traffic flow monitoring system using an optical fiber, physical properties of back scattered light are affected not only by vibration from a vehicle but also by a noise due to vibration from a machine other than a vehicle, strong wind, or the like. Thus, when the physical properties of the back scattered light being detected include an influence of such a noise, a calculated speed may have an error. Further, an error in the calculated speed causes degradation of accuracy for detecting a change in a traffic flow, such as a traffic jam.

Object of Present Invention

An object of the present invention is to provide a technique capable of detecting a change in a traffic flow with high accuracy.

Solution to Problem

A traffic flow monitoring device according to the present invention includes:
  a detection means for outputting a first comparison result being a comparison result between an average speed at a first time and a first reference speed, based on speed data in which the average speed of a vehicle traveling through a prescribed spot on a road and a time are associated with each other;
  an approximate speed calculation means for acquiring an approximate speed at the first time, based on a change in the average speed at or before the first time; and
  a determination means for determining a change in a traffic flow at the prescribed spot, based on the first comparison result and a second comparison result being a comparison result between the approximate speed and a second reference speed.

A traffic flow monitoring method according to the present invention includes:
  outputting a first comparison result being a comparison result between an average speed at a first time and a first reference speed, based on speed data in which the average speed of a vehicle traveling through a prescribed spot on a road and a time are associated with each other;
  acquiring an approximate speed at the first time, based on a change in the average speed at or before the first time; and
  determining a change in a traffic flow at the prescribed spot, based on the first comparison result and a second comparison result being a comparison result between the approximate speed and a second reference speed.

A recording medium according to the present invention records a program for causing a computer included in a traffic flow monitoring device to execute:
  a procedure of outputting a first comparison result being a comparison result between an average speed at a first time and a first reference speed, based on speed data in which the average speed of a vehicle traveling through a prescribed spot on a road and a time are associated with each other;
  a procedure of acquiring an approximate speed at the first time, based on a change in the average speed at or before the first time; and
  a procedure of determining a change in a traffic flow at the prescribed spot, based on the first comparison result and a second comparison result being a comparison result between the approximate speed and a second reference speed.

Advantageous Effects of Invention

According to the present invention, a technique capable of detecting a change in a traffic flow with high accuracy is able to be provided.

BRIEF DESCRIPTION OF DRAWINGS

FIG. 11 is a diagram illustrating an example of a determination result of a traffic jam due to speed reduction in a traffic flow by using an approximate linear line.

EXAMPLE EMBODIMENT

Figure 1:
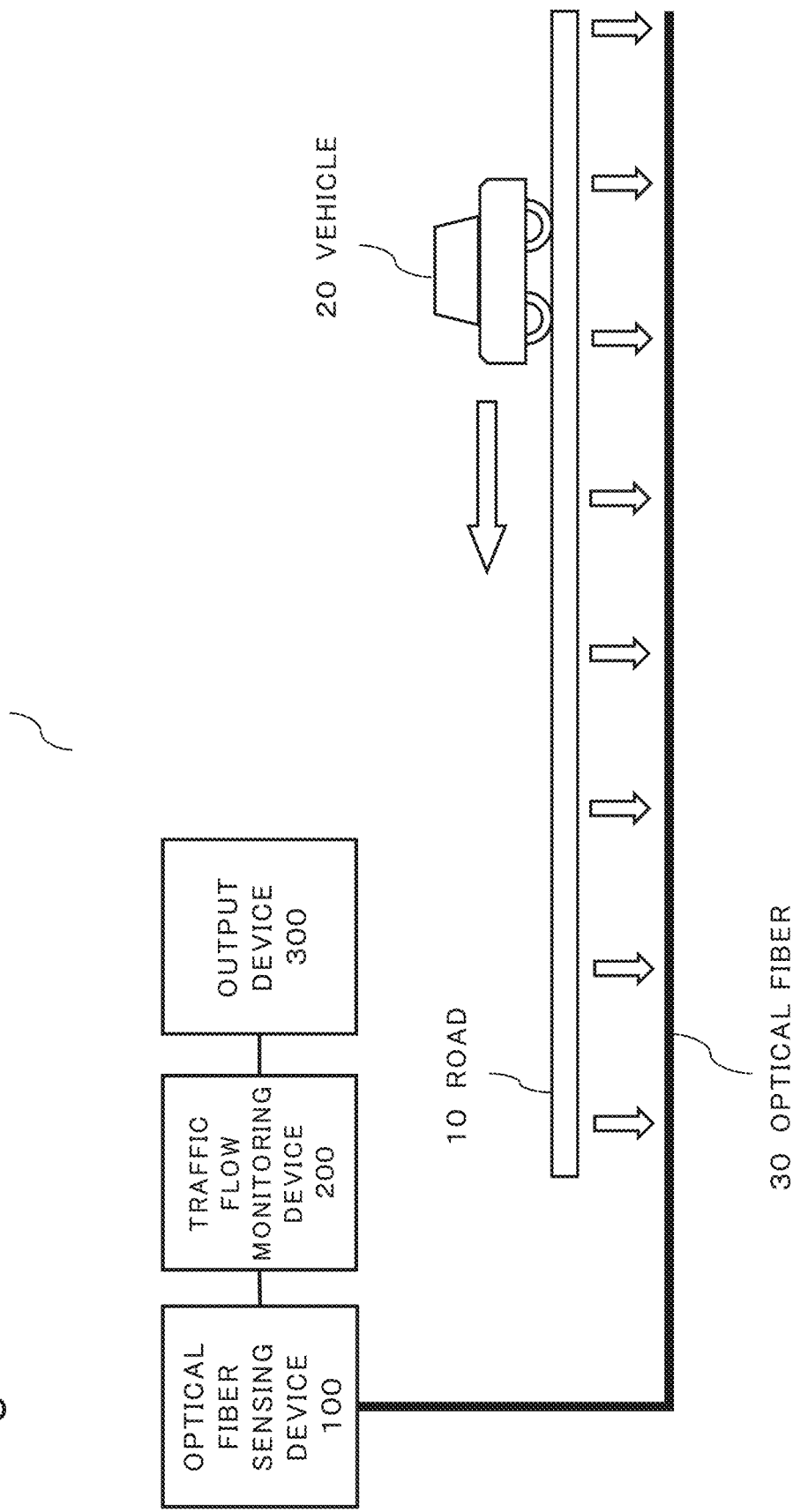
FIG. 1 is a diagram illustrating a configuration example of a traffic flow monitoring system 1.

Example embodiments of the present invention are described below with reference to the drawings. The directions of the arrows illustrated in the drawings are merely examples, and are not intended to limit the directions. Aforementioned elements are denoted with the same reference symbols in each of the example embodiments and the drawings, and overlapping description therefor is omitted.

First Example Embodiment

FIG. 1 is a diagram illustrating a configuration example of a traffic flow monitoring system 1 of the present invention. The traffic flow monitoring system 1 includes an optical fiber sensing device 100, a traffic flow monitoring device 200, and an output device 300. The optical fiber sensing device 100 transmits pulsed light to an optical fiber 30 that is laid along a road 10. Some of a plurality of optical fibers included in a communication optical cable laid in the vicinity of the road 10 may be used as the optical fiber 30. The optical fiber sensing device 100 receives back scattered light of the pulsed light, and acquires information relating to vibration applied to the optical fiber 30 in association with a position on the optical fiber 30. By analyzing a relationship between vibration and a position thereof, the optical fiber sensing device 100 is capable of acquiring an average speed of a vehicle 20 passing by the measurement spot on the road 10 along the optical fiber 30 at a measurement spot at a freely selected time. As the measurement spot, any spot on the road 10 along the optical fiber 30 may freely be selected. In this manner, the optical fiber sensing device 100 outputs data in which the average speed of the vehicle 20 traveling through the measurement spot on the road 10 and the time are associated with each other (hereinafter, referred to as "speed data") to the traffic flow monitoring device 200.

There has been known a technique of measuring the average speed of the vehicle 20 passing by a prescribed spot by analyzing the back scattered light that propagates in the optical fiber 30. For example, a technique relating to the road monitoring system described in PTL 1 is applicable to the optical fiber sensing device 100.

When the average speed of the vehicle at the prescribed spot changes beyond a prescribed threshold value, the traffic flow monitoring device 200 determines that a traffic flow changes in the section, based on the speed data that is acquired by the optical fiber sensing device 100. Details of an operation of the traffic flow monitoring device 200 are described later.

The output device 300 is a device that outputs a determination result from the traffic flow monitoring device to the outside, and is a display device, a printer, a lamp, or a buzzer, for example. When the traffic flow monitoring device 200 performs any sort of determination relating to a change in a traffic flow, the output device 300 displays contents thereof on a display screen or causes a printer to print the contents. In this state, the output device 300 may turn on a lamp or sound a buzzer.

Figure 2:
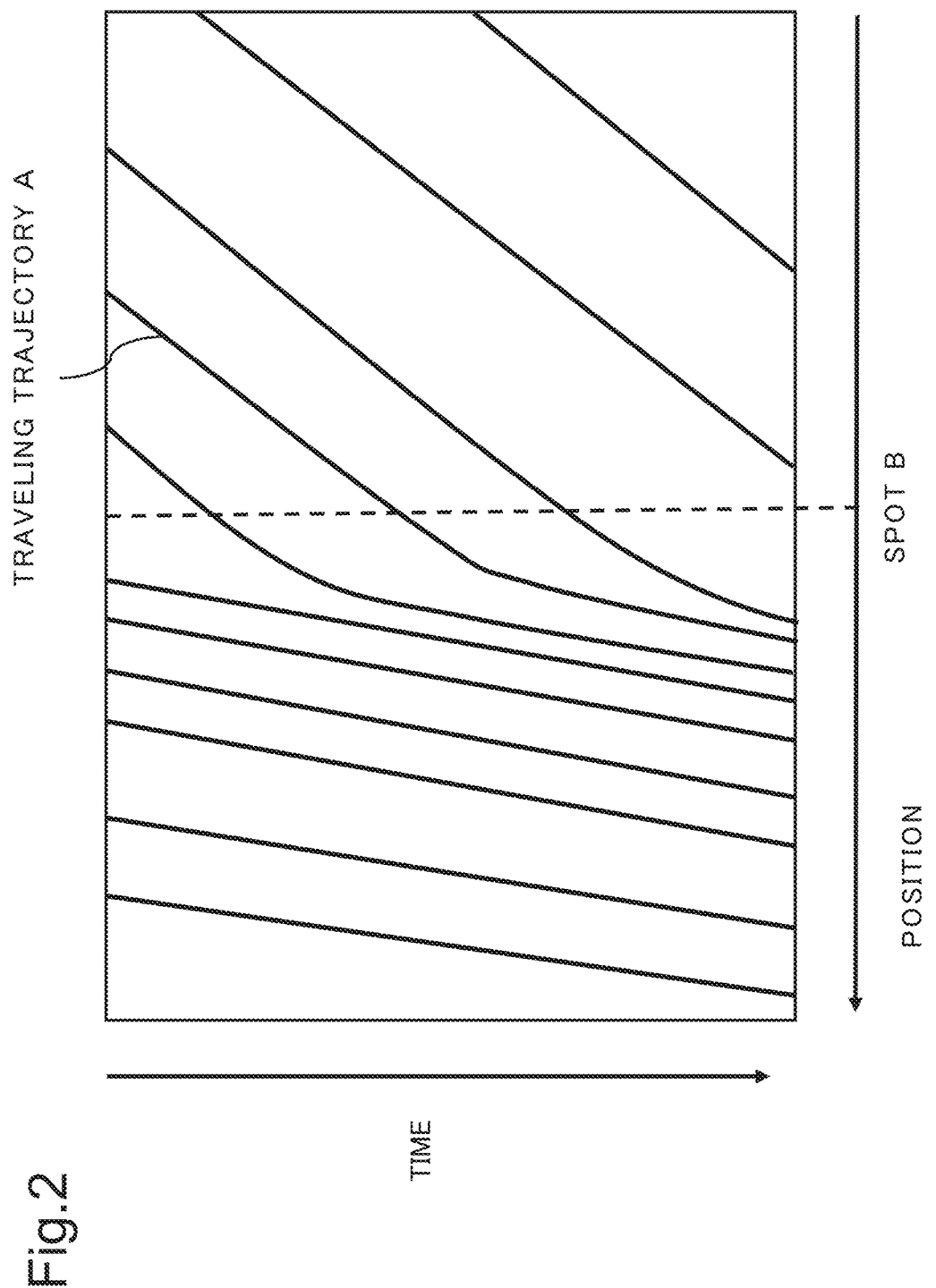
FIG. 2 is an example of a trajectory diagram that is acquired in the traffic flow monitoring system 1.

FIG. 2 is an example of a diagram illustrating a relationship between a position on a road and a time (hereinafter, referred to as a "trajectory diagram") that is used in the traffic flow monitoring system 1. In the following trajectory diagram, the horizontal axis indicates a position on the road 10, and the vertical axis indicates a time. One line illustrated in the trajectory diagram (hereinafter, referred to as a "traveling trajectory") is associated with one vehicle or a plurality of vehicles that travel through substantially the same position in the same direction. In the trajectory diagram, the vehicle advances from the right side to the left side in the horizontal axis, and the time elapses from the upper side to the lower side. In other words, as the time elapses, a traveling trajectory of each vehicle generally advances from the upper right side to the lower left side in the trajectory diagram. In the trajectory diagram, a steep slope of the traveling trajectory indicates that a short distance for which the vehicle advances in a fixed time period, in other words, a low speed of the vehicle. In contrast, in the trajectory diagram, a gentle slope of the traveling trajectory indicates that a long distance for which the vehicle advances in a fixed time period, in other words, a high speed of the vehicle. For example, it is indicated that a vehicle indicated with a traveling trajectory A in FIG. 2 moves at a relatively high speed to a spot B, but the speed is reduced after the spot B. As described above, the trajectory diagram is a diagram illustrating the speed of the vehicle at the measurement spot on the road 10, and includes information equivalent to the speed data that is output from the optical fiber sensing device 100. The optical fiber sensing device 100 may include a function of outputting the speed data on the road 10 as the trajectory diagram to the traffic flow monitoring device 200.

A change in a traffic flow at the spot B can be detected by recording a temporal change in the average speed of the vehicle passing by the spot B, which is acquired based on the trajectory diagram or the speed data, with a prescribed threshold. For example, when the average speed of the vehicle passing by the spot B is gradually reduced, and is equal to or less than a prescribed speed (for example, 40 km/h) at a time T1, the traffic flow monitoring device 200 may determine that there is a possibility of a traffic jam starting at the spot B at the time T1.

Figure 3:
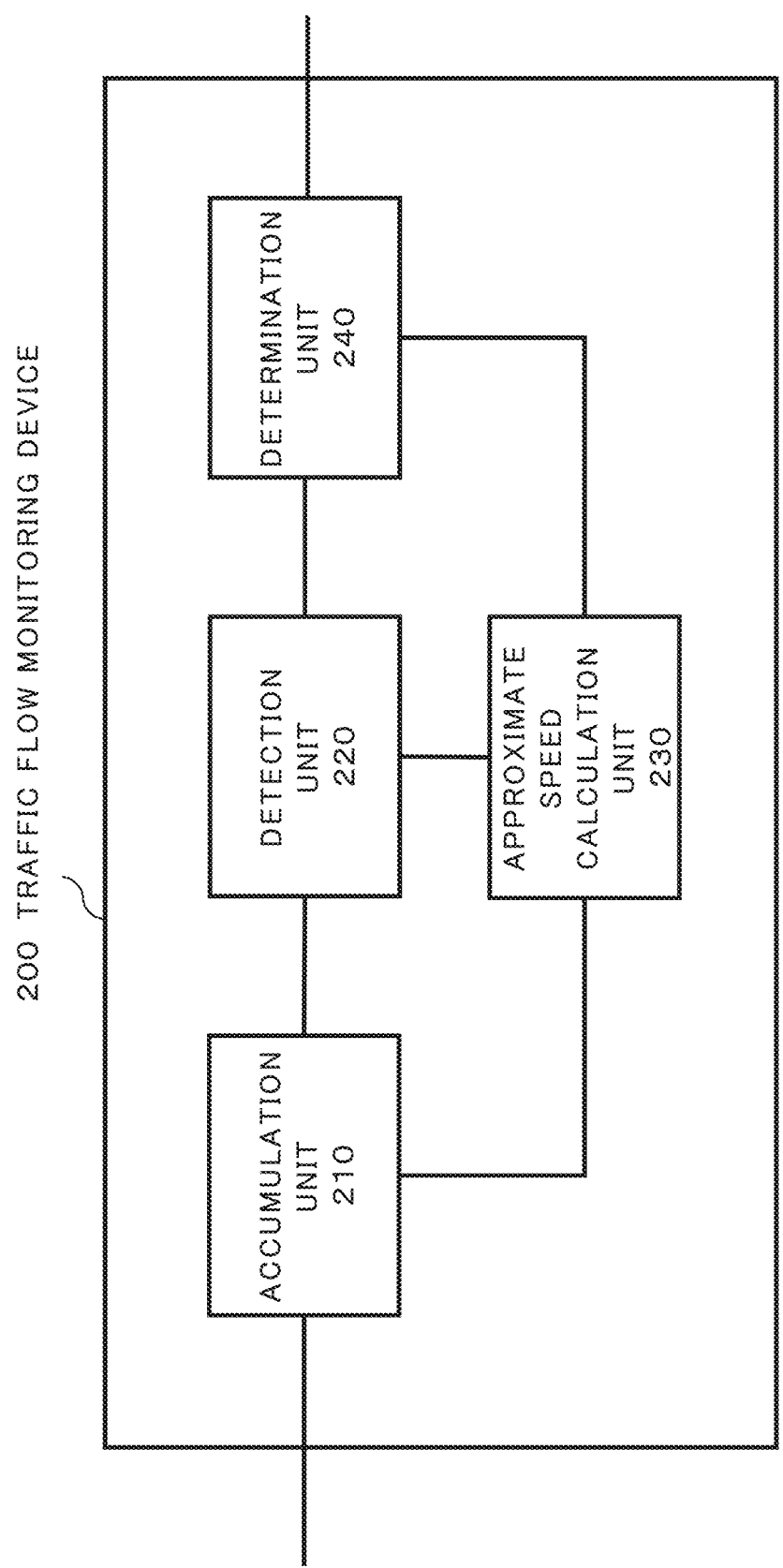
FIG. 3 is a block diagram illustrating a configuration example of a traffic flow monitoring device 200.

FIG. 3 is a block diagram illustrating a configuration example of the traffic flow monitoring device 200 that is used in the traffic flow monitoring system 1. The traffic flow monitoring device 200 includes an accumulation unit 210, a detection unit 220, an approximate speed calculation unit 230, and a determination unit 240.

The accumulation unit 210 accumulates the speed data that is input from the optical fiber sensing device 100, and provides the detection unit 220 and the approximate speed calculation unit 230 with the current and past speed data. The speed data is data in which a speed of the vehicle 20 traveling on the road 10 and a position on the road 10 are associated with each other. The accumulation unit 210 may output data relating to the trajectory diagram illustrated in FIG. 2 to the detection unit 220 and the approximate speed calculation unit 230. The accumulation unit 210 may be included in the optical fiber sensing device 100.

The detection unit 220 monitors a change in the average speed at the prescribed spot on the road 10. The detection unit 220 monitors the average speed of the vehicle at one or more spots on the road 10, and detects a spot at which the average speed is equal to or less than a first threshold value TH1 (for example, 40 km/h). When it is detected that the average speed is equal to or less than TH1 at the spot B, the detection unit 220 notifies the determination unit 240 and the approximate speed calculation unit 230 of the spot B and the time T1.

The approximate speed calculation unit 230 acquires an approximate speed of the vehicle passing by the spot B at the time T1, based on the average speed of the vehicle passing by the spot B at or before the time T1. The approximate speed calculation unit 230 may linearly approximate a temporal change in the average speed at or before the time T1, and may regard a speed at the time T1 as the approximate speed. Details of an operation of the approximate speed calculation unit 230 are described later.

When the average speed at the spot B is equal to or less than TH1 at the time T1 and the approximate speed is equal to or less than a second threshold value TH2 (for example, 60 km/h), the determination unit 240 determines that the average speed is reduced at the spot B at the time T1 and a traffic jam starts. The determination unit 240 outputs the determination result to the output device 300.

Herein, an influence of a noise at the time of detecting reduction in the average speed of the vehicle is described.

Figure 4:
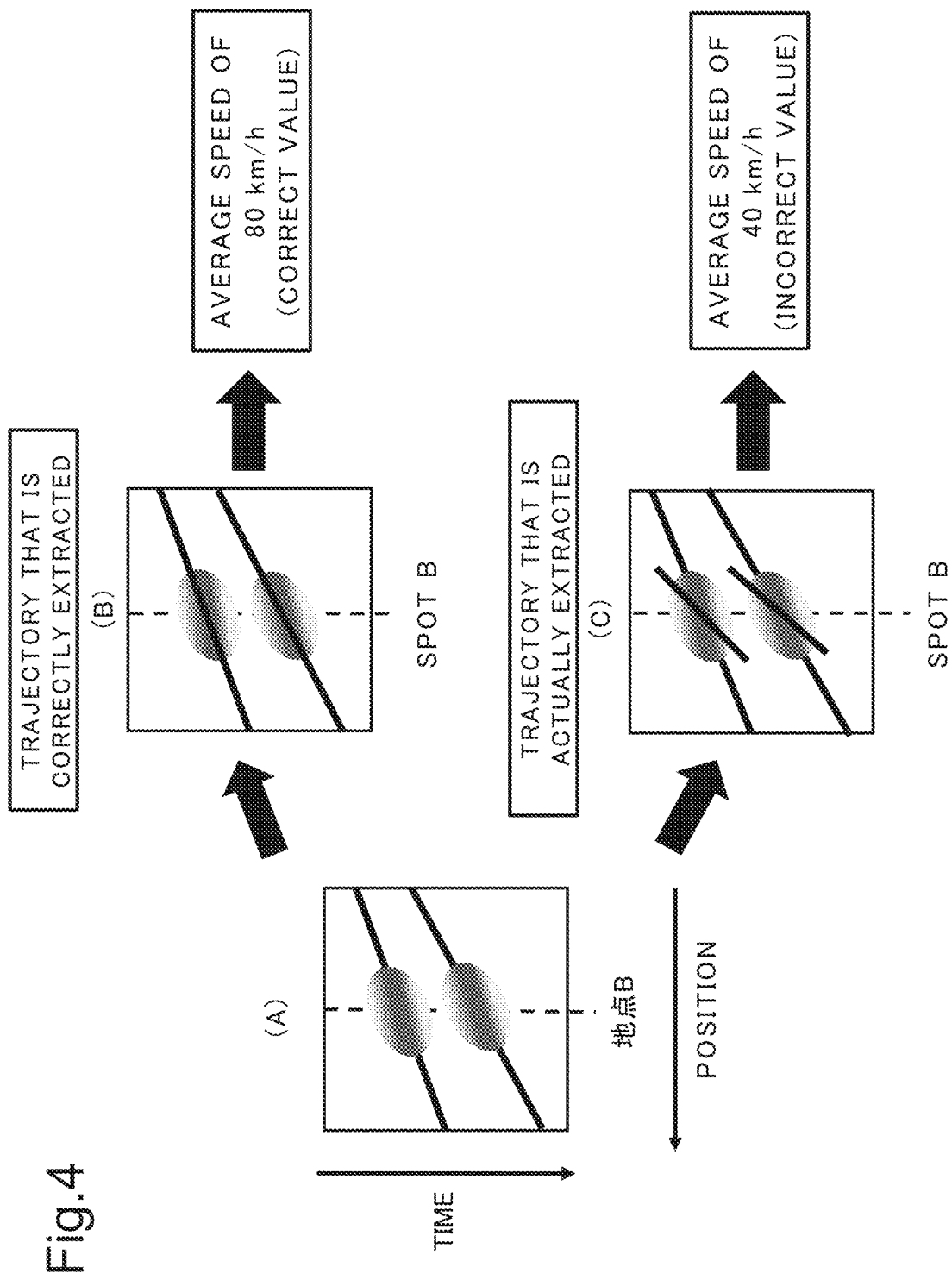
FIG. 4 is a diagram for describing an influence of a noise on the trajectory diagram.

FIG. 4 is a diagram for describing an influence of a noise on the trajectory diagram. (A) of FIG. 4 is an example of the trajectory diagram that is input to the detection unit 220. The trajectory diagram in FIG. 4 does not have a clear line in the vicinity of the spot B. This indicates that speed measurement values vary significantly in a section near the spot B on the road 10 due to a noise at the time of sensing of the optical fiber 30 by the optical fiber sensing device 100, in other words, a speed error is increased in the speed data near the spot B. In such a state, there may be a risk that the speed of the vehicle at the spot B that is acquired from the trajectory diagram or the speed data includes a significant error due to a noise. (B) of FIG. 4 is an example in which inclination of the trajectory (in other words, the speed of the vehicle) can be detected correctly from the trajectory diagram. In (B) of FIG. 4, the acquired speed (for example, 80 km/h) is a correct value that matches with the speeds in the nearby sections with less noises on the road 10. In contrast, (C) of FIG. 4 is an example in which inclination of the trajectory cannot be detected correctly from the trajectory diagram due to an influence of a noise. (C) of FIG. 4 illustrates an example in which inclination of the traveling trajectory is determined to be steeper due to an influence of a noise. As a result, the speed of the vehicle is calculated as 40 km/h. In this manner, when there is a significant noise during sensing, the acquired average speed may have a significant error due to variation in inclination of the traveling trajectory in some cases. Further, when a significant error due to the average speed is included, reduction in the average speed that is caused by a noise is misidentified as a change in a traffic flow, and there may be a risk that traffic jam information is erroneously issued. The traffic flow monitoring device 200 of the present example embodiment includes a function of suppressing erroneous detection due to such an influence of a noise at the time of detecting a change in the average speed.

With reference to FIGS. 5 to 8, description is made on a difference between a case in which reduction in the average speed is caused by a traffic jam and a case in which reduction in the average speed is caused by an error in the average speed due to a noise. The pieces of data in FIGS. 5 to 8 are based on different pieces of speed data. In other words, FIGS. 5 to 8 illustrate examples based on different traffic flows.

Figure 5:
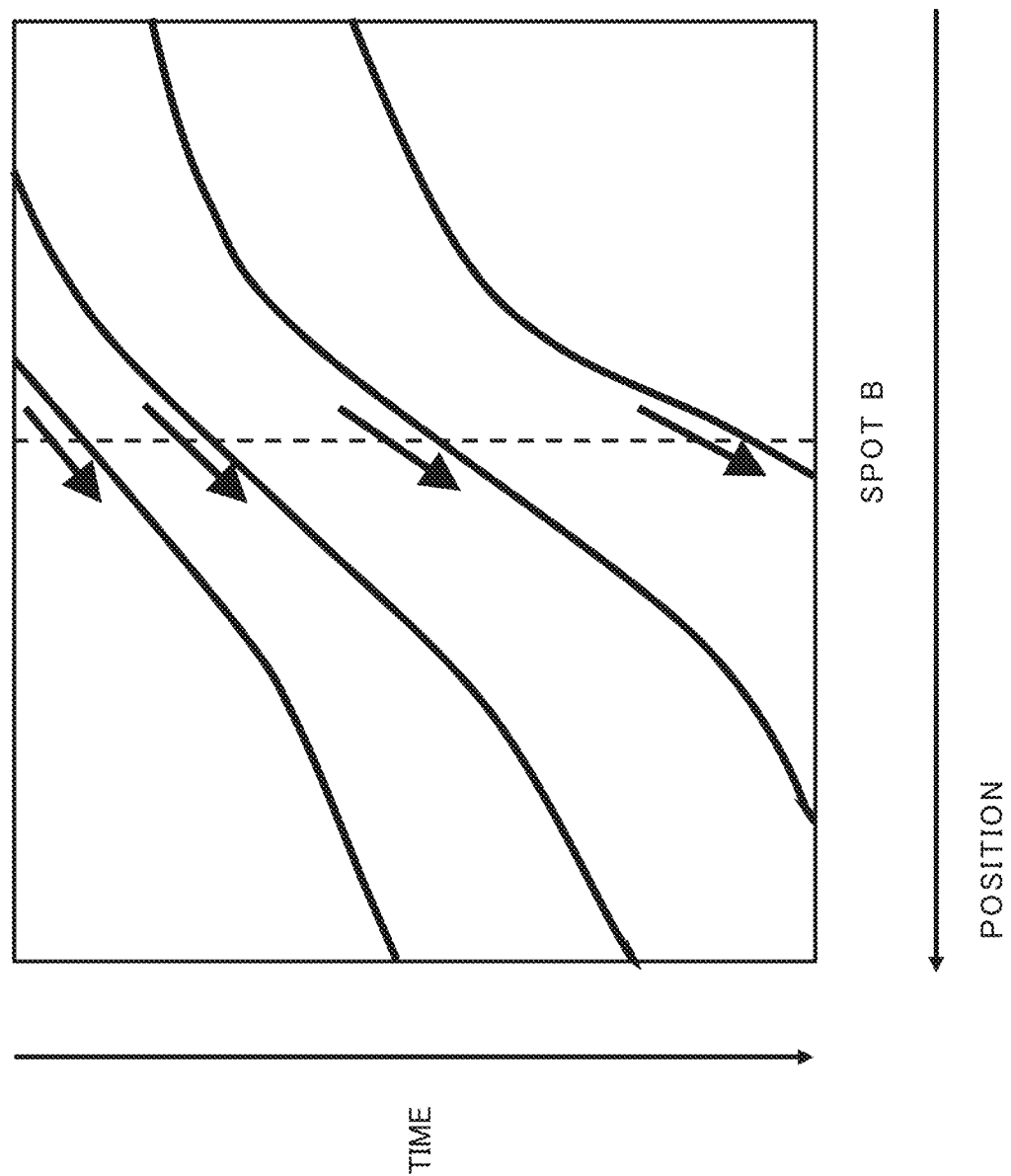
FIG. 5 is an example of the trajectory diagram for describing a change in a speed of a vehicle as a traffic jam starts.
Figure 6:
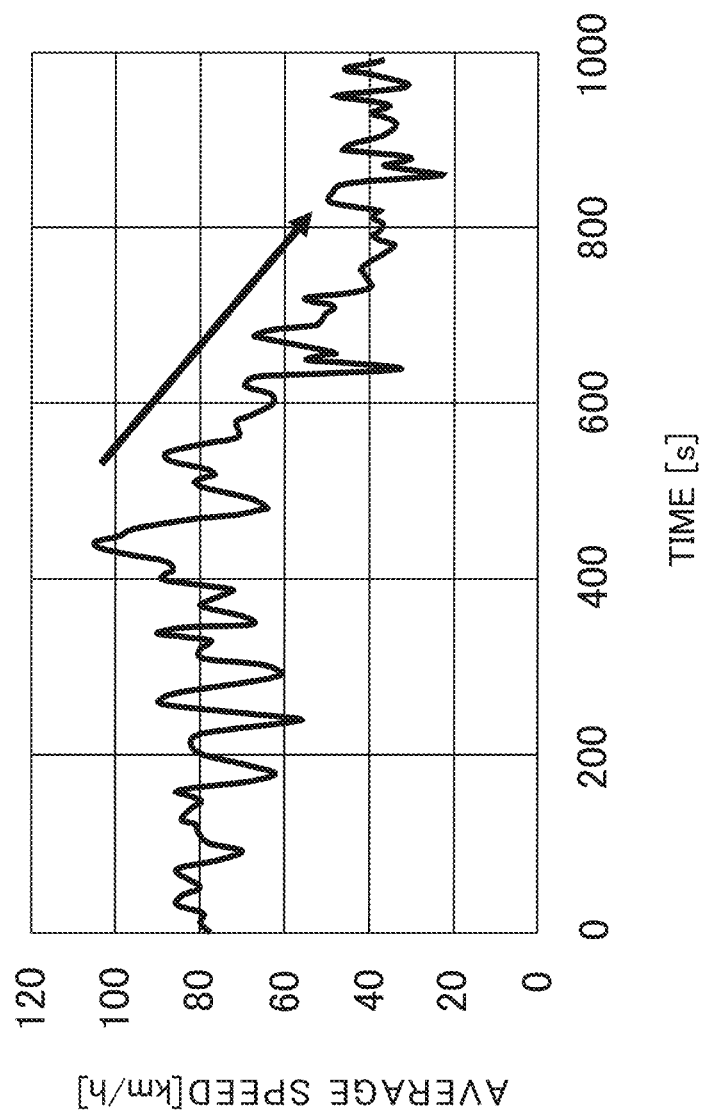
FIG. 6 is a diagram illustrating a measurement example of an average speed.

FIG. 5 is an example of the trajectory diagram for describing a change in the speed of the vehicle as a traffic jam starts. In FIG. 5, inclination of the trajectory at the spot B is gradually steeper as the time elapses, and this indicates that the average speed of the vehicle traveling through the spot B is gradually reduced. FIG. 6 is a diagram illustrating a measurement example of the average speed when the average speed is smoothly reduced at a certain spot. Between 500 seconds and 800 seconds of the elapse time on the horizontal axis in FIG. 6, the average speed of the vehicle is gradually reduced as the time elapses.

Figure 7:
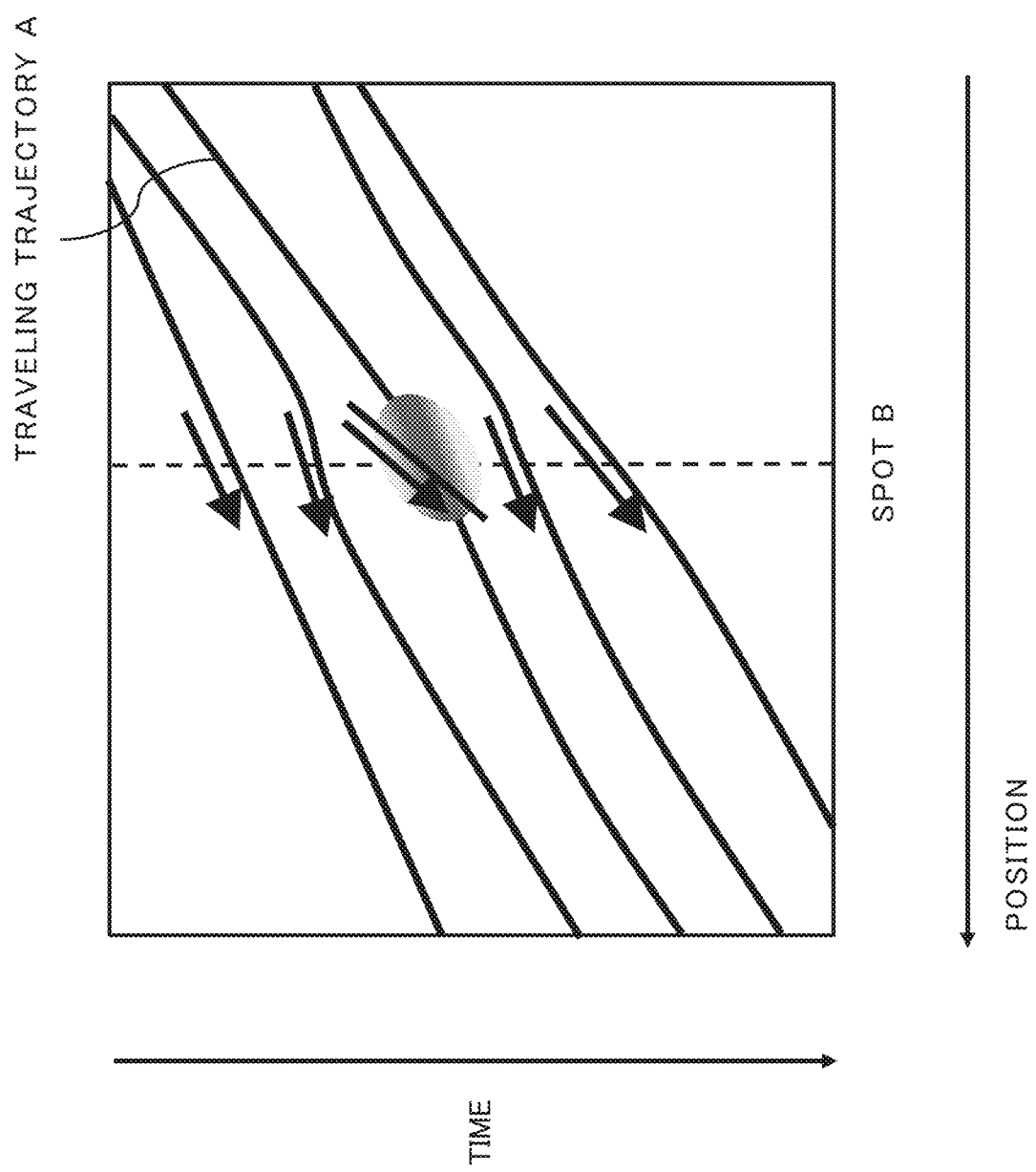
FIG. 7 is an example of the trajectory diagram for describing a change in a speed of a vehicle due to an influence of a noise.
Figure 8:
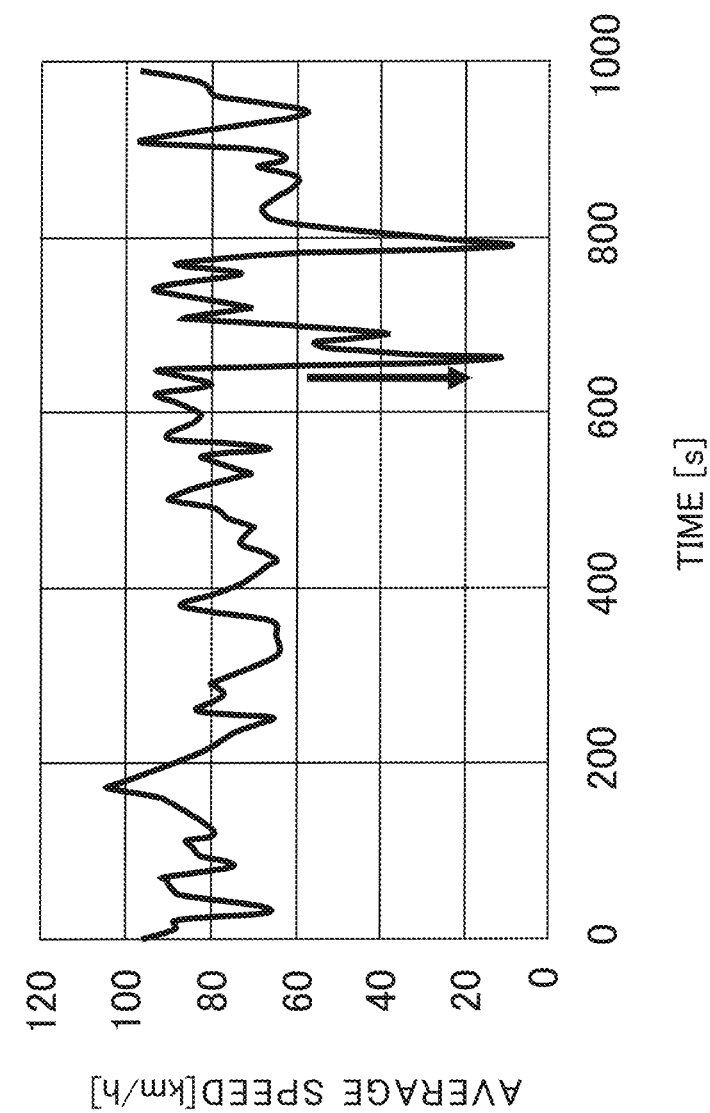
FIG. 8 is a diagram illustrating a measurement example of an average speed.

FIG. 7 is an example of the trajectory diagram for describing a change in the speed of the vehicle due to an influence of a noise. In the vicinity of the spot B in FIG. 7, the line of the traveling trajectory A is not clear. This indicates that an error in the speed in the traveling trajectory A is significant in the vicinity of the spot B due to an influence of a noise. Meanwhile, trajectory inclination of the traveling trajectory A in FIG. 7 is significantly different in the vicinity of the spot B from that in the preceding and following times due to a noise, but there is no particular tendency in a temporal change of the average speed at the spot B as compared to FIG. 5. FIG. 8 is a diagram illustrating a measurement example of the average speed when the average speed is temporarily changed significantly at a certain spot. The average speed of the vehicle is not significantly changed with respect to the elapse of time, but may be suddenly reduced significantly in a short time period due to an influence of a noise at the time of measurement in some cases. Thus, when a change in a traffic flow is determined based on speed reduction in such a short time period, there may be a risk that speed reduction due to a start of a traffic jam and speed reduction due to an influence of a noise cannot be detected in a distinguished manner.

The traffic flow monitoring device 200 includes the approximate speed calculation unit 230 and the determination unit 240 in such a way as to suppress erroneous detection of a traffic jam when a traffic flow is in a state illustrated in FIG. 7 or 8. When reduction in the average speed is detected at the time T1, the approximate speed calculation unit 230 acquires a linear line indicating a change in the average speed before the time T1 (an approximate linear line), and acquires a speed at the time T1 on the approximate linear line as the approximate speed. The approximate linear line may be acquired as a regression linear line indicating a temporal change in the average speed. In this manner, the approximate speed calculation unit 230 linearly approximates a temporal change in the average speed at or before the time T1, and regards an approximate linear line value at the time T1 as the approximate speed.

Figure 9:
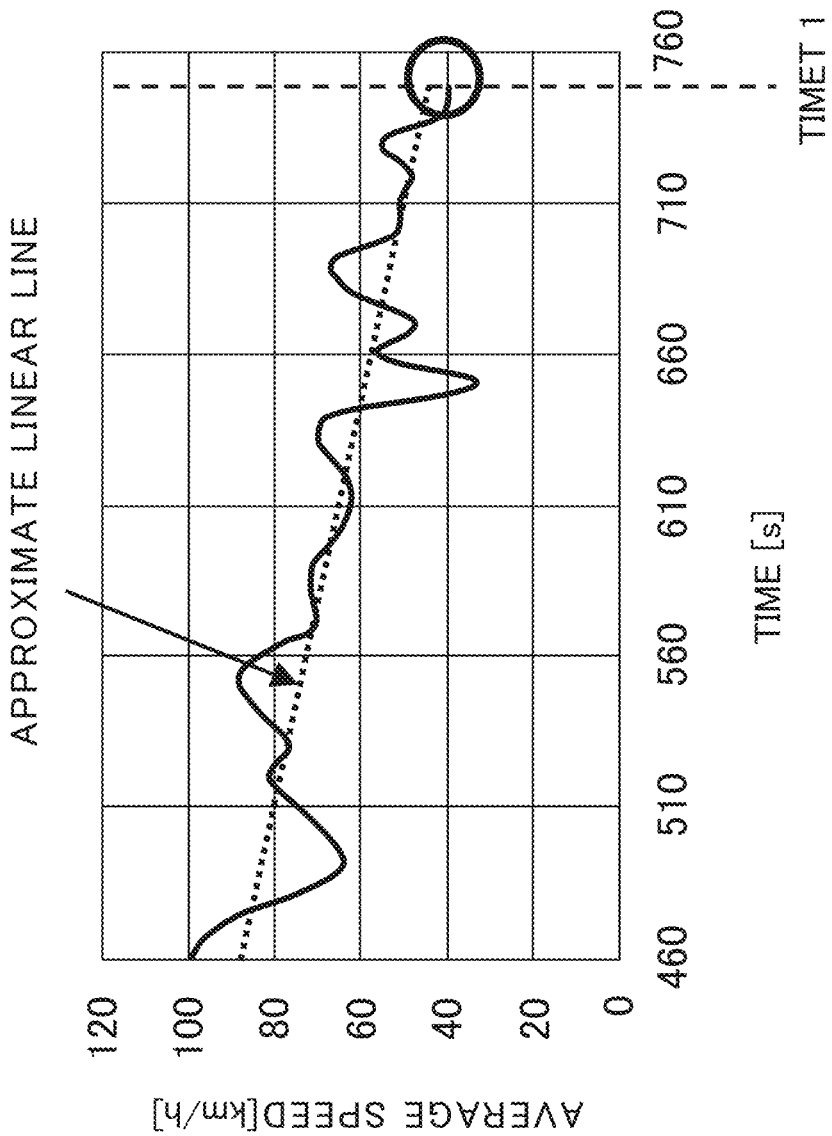
FIG. 9 is a diagram illustrating an example of a change in an average speed directly before a traffic jam starts.

FIG. 9 is a diagram illustrating an example of a change in the average speed directly before a traffic jam starts. Directly before a traffic jam starts at a certain spot, the average speed of the vehicle passing by the spot is gradually reduced. For example, on a highway, the average speed directly before a traffic jam starts is gradually reduced to 60 km/h or less in many cases. Further, when speed reduction due to a traffic jam is caused, a difference in speed reduction between the approximate speed at the time T1 and the average speed at the time is small (the circle in FIG. 9). In other words, the approximate speed at the time that is acquired by extrapolation of the approximate linear line up to the time T1 is a value close to the average speed at the time.

Figure 10:
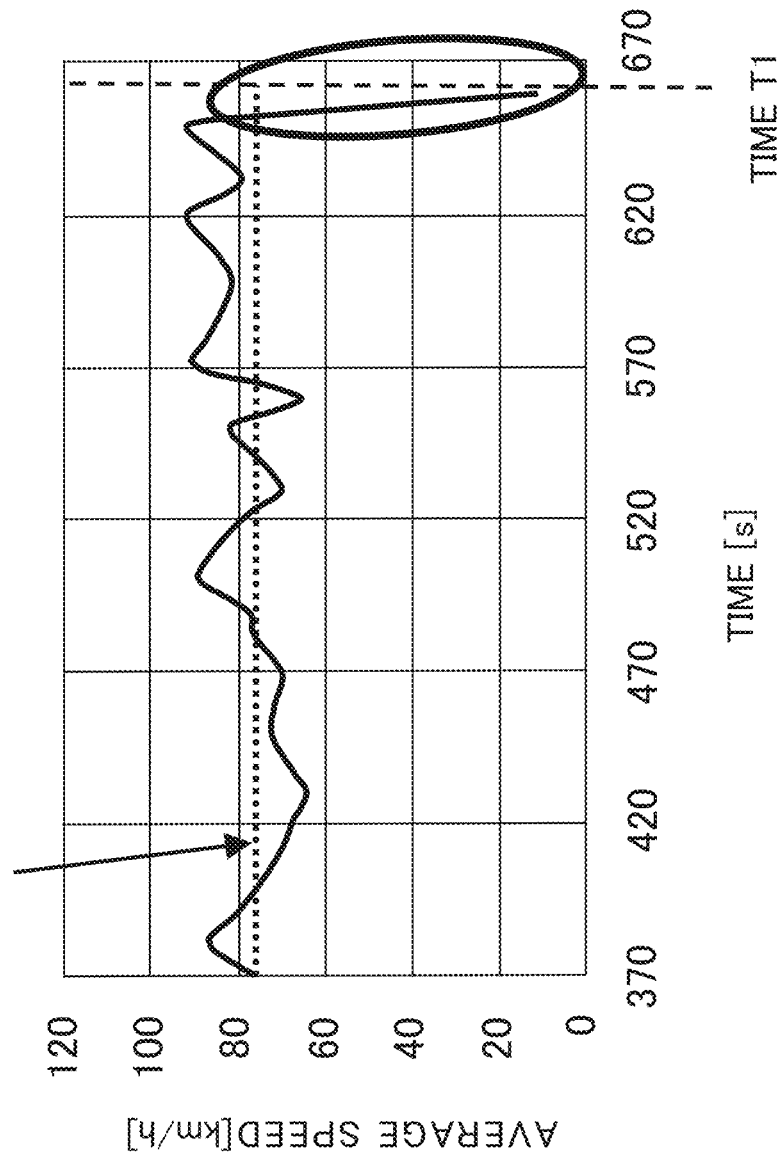
FIG. 10 is a diagram illustrating an example of a change in an average speed due to an error.

FIG. 10 is a diagram illustrating an example of a change in the average speed due to an error. As speed reduction due to an error caused by a noise suddenly occurs, there is no significant change in the approximate speed until reduction in the average speed due to a noise occurs, and only the average speed is suddenly reduced significantly due to an influence of a noise (the ellipse in FIG. 10). In this case, in a case in which reduction in the average speed is detected, when the approximate linear line indicating a change in the average speed immediately prior thereto is acquired, the approximate speed at the time when reduction in the average speed occurs is significantly higher than the average speed at the time.

The approximate speed at the time T1 at which reduction in the average speed is detected can be acquired by linearly approximating a change in the average speed directly before a traffic jam starts to acquire the approximate linear line and extrapolating the approximate linear line thus acquired. The extent to which past data relating to the average speed is used at the time of acquiring the approximate linear line may be determined according to a state of an actual traffic flow. For example, the approximate linear line may be acquired based on an average speed from any one of the past one minute, five minutes, and ten minutes at or before the time T1. Further, the determination unit 240 is capable of determining whether a significant change in the average speed at the time T1 is caused by a change in a traffic flow such as a traffic jam or is caused by an error in the average speed due to a noise or the like, by evaluating a relationship between the average speed and the approximate speed.

FIG. 11 is a diagram illustrating an example of a determination result of a traffic jam due to speed reduction in a traffic flow by using an approximate linear line. In this example, when the average speed of the vehicle is equal to or less than 40 km/h at a certain time on a highway, a change in the average speed is linearly approximated, and the approximate linear line is acquired. Further, when the approximate speed at the time that is acquired from the approximate linear line is equal to or less than 60 km/h, it is determined that a traffic jam occurs. Twenty examples in which a traffic jam actually occurs (correct data as "presence of a traffic jam") and twenty examples in which reduction in the average speed is observed but a traffic jam does not occur (correct data as "absence of a traffic jam") are determined by the configuration of the present example embodiment. FIG. 11 illustrates the number of examples that are determined as a traffic jam (the determination result as "presence of a traffic jam") and the number of examples that are not determined as a traffic jam (the determination result as "a speed error"). As illustrated in FIG. 11, all the twenty examples with the correct data as "presence of a traffic jam" are determined as "presence of a traffic jam", all the twenty examples with the correct data as "absence of a traffic jam" are determined as "a speed error", and hence the effectiveness of the traffic jam determination procedure of the present example embodiment is successfully confirmed.

Figure 12:
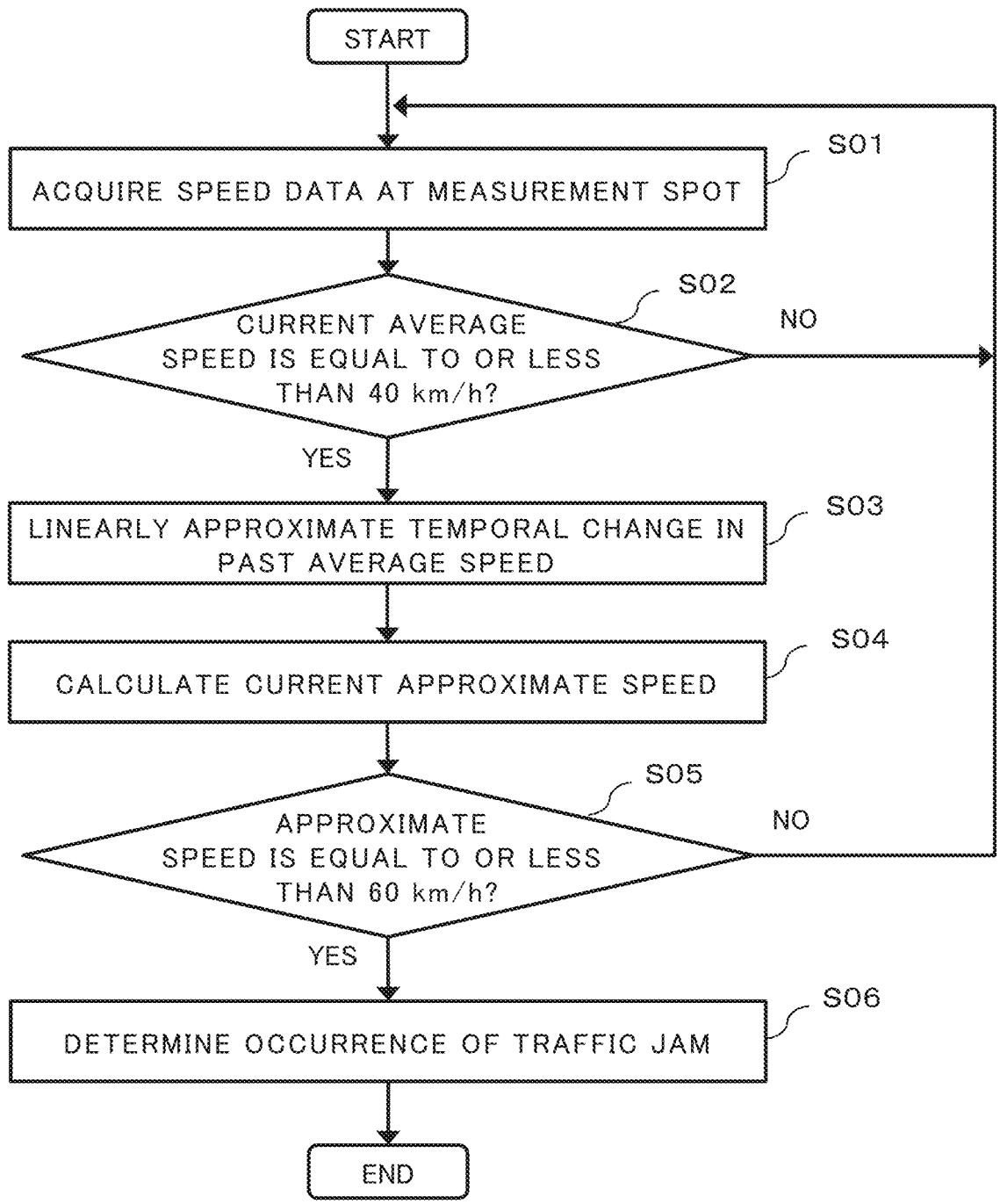
FIG. 12 is a flowchart illustrating an example of an operation procedure of the traffic flow monitoring device 200.

FIG. 12 is a flowchart illustrating an example of an operation procedure of the traffic flow monitoring device 200. The accumulation unit 210 acquires and accumulates the speed data at the measurement spot or the data relating to the trajectory diagram associated with the speed data from the optical fiber sensing device 100 (step S01 in FIG. 12). The measurement spot is a spot on the road 10 at which monitoring of a traffic flow is performed. When the detection unit 220 detects that the current average speed of the vehicle at the measurement spot is equal to or less than 40 km/h (step S02: YES), the approximate speed calculation unit 230 linearly approximates a temporal change in the average speed from the past average speed (step S03). The approximate speed calculation unit 230 acquires the current approximate speed, based on the linear line approximation result (step S04). The current approximate speed is the approximate speed at the time at which it is detected that the average speed is equal to or less than 40 km/h. When the approximate speed at the time at which the average speed is equal to or less than 40 km/h is equal to or less than 60 km/h (step S05: YES), the determination unit 240 determines that a traffic jam occurs at the measurement spot (step S06). The determination unit 240 may output the determination result to the output device 300.

In FIG. 12, it is assumed that the threshold value of the average speed in step S02 (the first threshold value) is 40 km/h and the threshold value of the approximate speed in step S05 (the second threshold value) is 60 km/h. However, the first and second threshold values are not limited thereto. The first and second threshold values may be set according to an actual traffic flow.

As described above, the traffic flow monitoring device 200 of the present example embodiment and the traffic flow monitoring system 1 including the same determine a sudden change in a traffic flow by using the average speed and the approximate speed. Thus, even when the speed data includes an influence of a noise, a sudden change in a traffic flow, such as a start of a traffic jam, can be detected with high accuracy.

Modification Example of First Example Embodiment

The traffic flow monitoring device 200 described in the first example embodiment can also be used for determination on alleviation of a traffic jam. When a traffic jam is alleviated at the measurement spot at which it is determined that a traffic jam occurs in step S06 in FIG. 12, the average speed of the vehicle at the measurement spot is gradually elevated. However, when alleviation of a traffic jam is determined only by a change in the average speed, a case where the average speed is suddenly elevated due to an influence of a noise included in the speed data causes erroneous determination indicating alleviation of a traffic jam.

In view of this, description is made on an example of a procedure of applying the determination method using the approximate speed, which is described in the first example embodiment, to determination on alleviation of a traffic jam.

Figure 13:
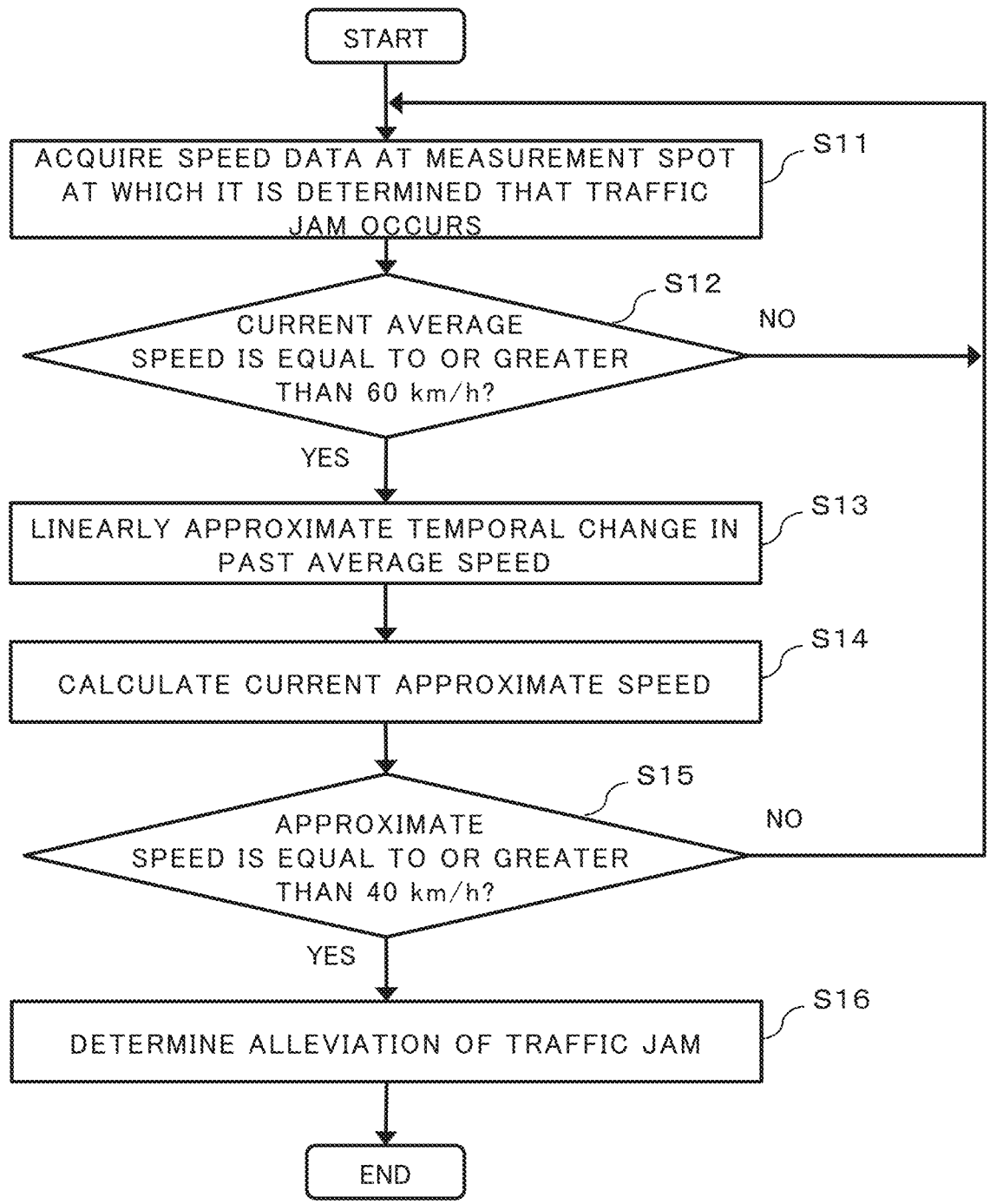
FIG. 13 is a flowchart illustrating an example of another operation procedure of the traffic flow monitoring device 200.

FIG. 13 is a flowchart illustrating an example of another operation procedure of the traffic flow monitoring device 200. The configurations of the traffic flow monitoring device 200 and the traffic flow monitoring system 1 are similar to those in the first example embodiment.

The accumulation unit 210 acquires and accumulates the speed data at the measurement spot at which it is determined that a traffic jam occurs or the data relating to the trajectory diagram associated with the speed data from the optical fiber sensing device 100 (step S11 in FIG. 13). When the detection unit 220 detects that the current average speed of the vehicle at the measurement spot is equal to or greater than 60 km/h (step S12: YES), the approximate speed calculation unit 230 linearly approximates a temporal change in the average speed from the past average speed (step S13). In the procedure illustrated in FIG. 13, the linear line approximation result may also be acquired as the approximate linear line indicating a change in the average speed. The approximate speed calculation unit 230 acquires the current approximate speed, based on the linear line approximation result (step S14). The current approximate speed is the approximate speed at the time at which it is detected that the average speed is equal to or greater than 60 km/h. The current approximate speed may be acquired by extrapolating the approximate linear line. When the approximate speed at the time at which the average speed is equal to or greater than 60 km/h is equal to or greater than 40 km/h (step S15: YES), the determination unit 240 determines that a traffic jam is alleviated at the measurement spot (step S16). The determination unit 240 may output the determination result to the output device 300.

In FIG. 13, it is assumed that a threshold value of the average speed in step S12 (a third threshold value) is 60 km/h and a threshold value of the approximate speed in step S15 (a fourth threshold value) is 40 km/h. However, the third and fourth threshold values are not limited thereto. The third and fourth threshold values may be set according to an actual traffic flow.

In this manner, even when the speed data includes an influence of a noise, the traffic flow monitoring device 200 and the traffic flow monitoring system 1 including the same are capable of detecting alleviation of a traffic jam with high accuracy by changing a determination reference relating to a relationship between the threshold values and the speeds and the threshold values.

Second Example Embodiment

Figure 14:
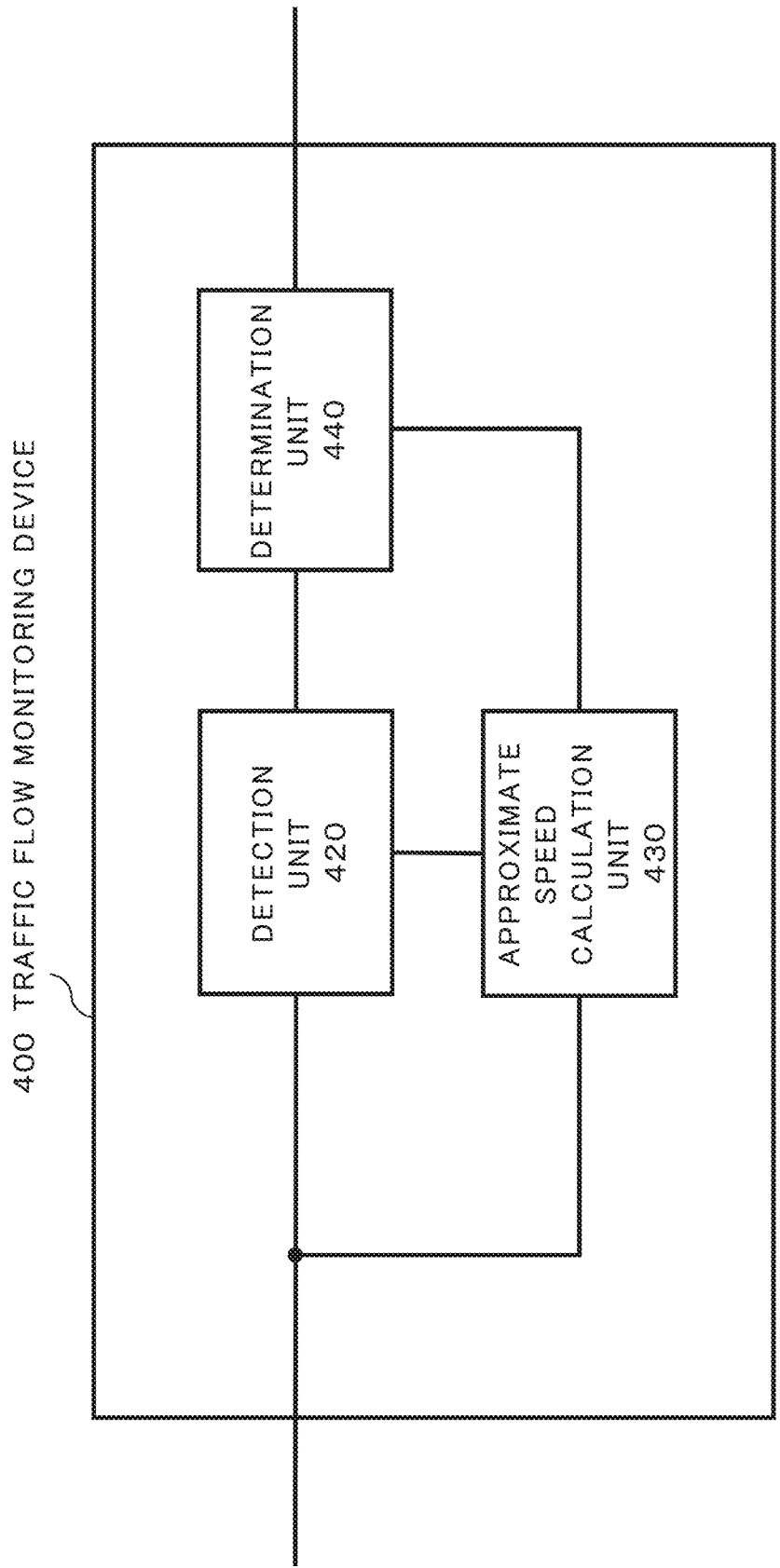
FIG. 14 is a block diagram illustrating a configuration example of a traffic flow monitoring device 400 of a second example embodiment.

FIG. 14 is a block diagram illustrating a configuration example of a traffic flow monitoring device 400 of a second example embodiment. The traffic flow monitoring device 400 includes a detection unit 420, an approximate speed calculation unit 430, and a determination unit 440.

The detection unit 420 functions as a detection means for outputting a first comparison result being a comparison result between an average speed and a first reference speed, based on speed data in which an average speed of a vehicle traveling through a prescribed spot on a road and a time are associated with each other.

The approximate speed calculation unit 430 functions as an approximate speed calculation means for acquiring an approximate speed at a first time, based on a change in the average speed at or before the first time.

The determination unit 440 functions as a determination means for determining a change in a traffic flow at the prescribed spot, based on the first comparison result that is output from the detection unit 420 and a second comparison result being a comparison result between the approximate speed and a second reference speed.

The traffic flow monitoring device 400 thus configured determines a change in a traffic flow, based on the comparison result between the average speed and the first reference speed and the comparison result between the approximate speed that is acquired based on a change in the past average speed and the second reference speed. Thus, even when the speed data includes an influence of a noise, a change in a traffic flow can be detected with high accuracy by simultaneously using evaluation based on the approximate speed.

The approximate speed calculation unit 230 may linearly approximate a change in the average speed at or before the first time, and regards an approximate linear line value at the first time as the approximate speed.

Further, the first reference speed may be 40 km/h, and the second reference speed may be 60 km/h. Further, when the average speed is reduced to 40 km/h or less at the first time and the approximate speed at the time is equal to or less than 60 km/h, the determination unit 240 may determine that a traffic jam occurs at the prescribed spot.

Alternatively, the first reference speed may be 60 km/h, and the second reference speed may be 40 km/h. Further, when the average speed is elevated to 60 km/h or greater at the first time and the approximate speed at the time is equal to or greater than 40 km/h, the determination unit 240 may determine that a traffic jam is alleviated at the prescribed spot.

In this manner, the traffic flow monitoring device 400 is capable of detecting a change in a traffic flow, such as a start or alleviation of a traffic jam, with high accuracy. The traffic flow monitoring device 400 may be used in the traffic flow monitoring system 1 described in the first example embodiment, in place of the traffic flow monitoring device 200. In such a case, the function of the accumulation unit 210 of the traffic flow monitoring device 200 may be achieved by the optical fiber sensing device 100.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Each of the traffic flow monitoring devices 200 and 400 in the example embodiments may include a central processing unit (CPU) and a storage unit. The CPU may achieve some or all the functions of the constituent elements of the traffic flow monitoring devices 200 and 400 in software by executing a program.

In other words, the CPU may achieve the functions in software by executing a program stored in the storage unit and controlling the operations of the traffic flow monitoring devices 200 and 400. Some or all of the functions of the traffic flow monitoring device 200 may be achieved by a program executed on a server. The server may be connected to the optical fiber sensing device 100 and the output device 300 via a network. The server may further include some or all of the functions of the optical fiber sensing device 100 and the output device 300.

Further, the configurations described in the example embodiments are not necessarily mutually exclusive. The actions and the effects of the present invention may be achieved by a configuration in which all or some of the above-mentioned example embodiments are combined.

REFERENCE SIGNS LIST

1 Traffic flow monitoring system
10 Road

20 Vehicle
30 Optical fiber
100 Optical fiber sensing device
200, 400 Traffic flow monitoring device
210 Accumulation unit
220, 420 Detection unit
230, 430 Approximate speed calculation unit
240, 440 Determination unit
300 Output device

What is claimed is:

1. A traffic flow monitoring device comprising:
a detection circuit configured to output a first comparison result being a comparison result between an average speed at a first time and a first reference speed, based on speed data in which the average speed of a vehicle traveling through an optical fiber laid on a prescribed spot on a road and a time are associated with each other;
an approximate speed calculation circuit configured to acquire an approximate speed at the first time, based on a change in the average speed at or before the first time; and
a determination circuit configured to determine a change in a traffic flow at the prescribed spot, based on the first comparison result and a second comparison result being a comparison result between the approximate speed and a second reference speed,
wherein the approximate speed calculation circuit linearly approximates a temporal change in the average speed at or before the first time, and regards an approximate linear line value at the first time as the approximate speed.

2. The traffic flow monitoring device according to claim 1, wherein,
in a case in which the first reference speed is a first threshold value and the second reference speed is a second threshold value,
when the first comparison result indicates that the average speed is equal to or less than the first threshold value at the first time, and the approximate speed is equal to or less than the second threshold value,
the determination circuit determines that a traffic jam occurs at the prescribed spot.

3. The traffic flow monitoring device according to claim 1, wherein,
in a case in which the first reference speed is a third threshold value and the second reference speed is a fourth threshold value,
when the first comparison result indicates that the average speed is equal to or greater than the third threshold value at the first time, and the approximate speed is equal to or greater than the fourth threshold value,
the determination circuit determines that a traffic jam is alleviated at the prescribed spot.

4. The traffic flow monitoring device according to claim 3, wherein, when the approximate speed is equal to or greater than the fourth threshold value, the determination circuit determines that a traffic jam is alleviated at the prescribed spot.

5. The traffic flow monitoring device according to claim 1, further comprising an optical fiber sensing circuit configured to accumulate the speed data being acquired by analyzing back scattered light in an optical fiber.

6. A traffic flow monitoring method comprising:
outputting a first comparison result being a comparison result between an average speed at a first time and a first reference speed, based on speed data in which the average speed of a vehicle traveling through an optical fiber laid on a prescribed spot on a road and a time are associated with each other;
acquiring an approximate speed at the first time, based on a change in the average speed at or before the first time; and
determining a change in a traffic flow at the prescribed spot, based on the first comparison result and a second comparison result being a comparison result between the approximate speed and a second reference speed,
wherein the method further comprises:
approximating a temporal change in the average speed at or before the first time; and
regarding an approximate linear line value at the first time as the approximate speed.

7. The traffic flow monitoring method according to claim 6, further comprising:
approximating a temporal change in the average speed at or before the first time; and
regarding an approximate linear line value at the first time as the approximate speed.

8. The traffic flow monitoring method according to claim 6, further comprising,
in a case in which the first reference speed is a first threshold value and the second reference speed is a second threshold value, when the first comparison result indicates that the average speed is equal to or less than the first threshold value at the first time, and the approximate speed is equal to or less than the second threshold value, determining that a traffic jam occurs at the prescribed spot.

9. A tangible and non-transitory recording medium recording a program for causing a computer included in a traffic flow monitoring device to execute:
a procedure of outputting a first comparison result being a comparison result between an average speed at a first time and a first reference speed, based on speed data in which the average speed of a vehicle traveling through an optical fiber laid on a prescribed spot on a road and a time are associated with each other;
a procedure of acquiring an approximate speed at the first time, based on a change in the average speed at or before the first time; and
a procedure of determining a change in a traffic flow at the prescribed spot, based on the first comparison result and a second comparison result being a comparison result between the approximate speed and a second reference speed,
wherein the program is further configured to execute:
a procedure of approximating a temporal change in the average speed at or before the first time; and
a procedure of regarding an approximate linear line value at the first time as the approximate speed.

* * * * *